(12) United States Patent
Anandaiah Shetty Nagaraja

(10) Patent No.: US 10,628,871 B2
(45) Date of Patent: Apr. 21, 2020

(54) METHOD AND SYSTEM FOR PROVIDING CUSTOMIZED PRODUCT RECOMMENDATIONS TO CONSUMERS

(71) Applicant: WIPRO LIMITED, Bangalore (IN)

(72) Inventor: Kothamangala Anandaiah Shetty Nagaraja, Mulbagal (IN)

(73) Assignee: Wipro Limited, Bangalore (IN)

( * ) Notice: Subject to any disclaimer, the term of this patent is extended or adjusted under 35 U.S.C. 154(b) by 227 days.

(21) Appl. No.: 15/938,891

(22) Filed: Mar. 28, 2018

(65) Prior Publication Data
US 2019/0303993 A1 Oct. 3, 2019

(30) Foreign Application Priority Data
Mar. 28, 2018 (IN) .............................. 201841011604

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0261* (2013.01); *G06Q 30/0269* (2013.01); *G06Q 30/0621* (2013.01)

(58) Field of Classification Search
CPC .......... G06Q 30/0631; G06Q 30/0261; G06Q 30/0269; G06Q 30/0621
See application file for complete search history.

(56) References Cited

U.S. PATENT DOCUMENTS

| | | | |
|---|---|---|---|
| 8,380,946 B2 * | 2/2013 | Hetzler | G11C 16/349 |
| | | | 711/156 |
| 8,700,586 B2 | 4/2014 | Celik | |
| 9,721,262 B2 | 8/2017 | Krone | |
| 2002/0000092 A1 * | 1/2002 | Sharood | F25D 29/00 |
| | | | 62/127 |
| 2003/0172072 A1 * | 9/2003 | Smith | G06Q 10/087 |
| 2008/0288522 A1 | 11/2008 | Hunt et al. | |

(Continued)

OTHER PUBLICATIONS

Lindkvist, Louise, and Erik Sundin. "The role of Product-Service Systems regarding information feedback transfer in the product life-cycle including remanufacturing." Procedia Cirp 47: 311-316. (Year: 2016).*

*Primary Examiner* — Matthew E Zimmerman
(74) *Attorney, Agent, or Firm* — Finnegan, Henderson, Farabow, Garrett & Dunner, LLP

(57) ABSTRACT

This disclosure relates generally to product promotions, and more particularly to method and system for providing customized product recommendations to consumers. In one embodiment, the method may include determining a location of a consumer and a target product segment of interest to the consumer, determining a plurality of field-installed products in the target product segment and in a geographic area of the location, gathering near real-time operational data from each of the plurality of field-installed products along with a plurality of associated parameters for the geographic region using application scripts pre-installed in each of the plurality of field-installed products, and dynamically analyzing the near real-time operational data and the plurality of associated parameters to determine and recommend a set of products in the target product segment.

18 Claims, 6 Drawing Sheets

(56) References Cited

U.S. PATENT DOCUMENTS

2011/0178839 A1 7/2011 Adra
2014/0101058 A1* 4/2014 Castel .................... G06Q 10/20
                                                            705/305
2014/0365270 A1 12/2014 Davis et al.

* cited by examiner

METHOD AND SYSTEM FOR PROVIDING CUSTOMIZED PRODUCT RECOMMENDATIONS TO CONSUMERS

TECHNICAL FIELD

This disclosure relates generally to product promotions, and more particularly to method and system for providing customized product recommendations to consumers.

BACKGROUND

In an increasingly digital and interconnected world, there has been a paradigm shift in the way consumers make purchase decisions and shop for various products. For example, technological advancements have remarkably contributed to facilitate ease of shopping through different channels and to provide accessibility to various product vendors over Internet. Further, the online or retail vendors may provide consumers with various innovative solutions so as to enable consumers in choosing right products based on their requirements. These innovative solutions may include artificial intelligence (AI) or virtual reality (VR) based human modeling for clothes size selection, customer pool review based product recommendation over search results, personalized product recommendation based on the user browsing history, and so forth. However, despite such advance solutions, the consumers may still fail to get the right products as per their requirements. Additionally, in some cases, the purchased product may fail before its operational life cycle due to different operational environment at the consumer's location than that deemed appropriate for working of the product.

Currently, the product manufacturers depend on their product production, product sales, and product servicing team to generate product information data through sales data, servicing data, customer feedback, online surveys, or the like. However, none of the feedback mechanisms provide accurate and reliable data regarding functionality of the products installed at the consumers' premises so as to validate product failures, expand product portfolio, provide customized product recommendations, and so forth.

SUMMARY

In one embodiment, a method for providing customized product recommendations to a consumer is disclosed. In one example, the method may include determining a location of the consumer and a target product segment of interest to the consumer. The method may further include determining a plurality of field-installed products in the target product segment and in a geographic area of the location. The method may further include gathering near real-time operational data from each of the plurality of field-installed products along with a plurality of associated parameters for the geographic region using application scripts pre-installed in each of the plurality of field-installed products. The method may further include dynamically analyzing the near real-time operational data and the plurality of associated parameters to determine and recommend a set of products in the target product segment.

In one embodiment, a system for providing customized product recommendations to a consumer is disclosed. In one example, the system may include a product recommendation device that may include at least one processor and a memory communicatively coupled to the at least one processor. The memory may store processor-executable instructions, which, on execution, may cause the processor to determine a location of the consumer and a target product segment of interest to the consumer. The processor-executable instructions, on execution, may further cause the processor to determine a plurality of field-installed products in the target product segment and in a geographic area of the location. The processor-executable instructions, on execution, may further cause the processor to gather near real-time operational data from each of the plurality of field-installed products along with a plurality of associated parameters for the geographic region using application scripts pre-installed in each of the plurality of field-installed products. The processor-executable instructions, on execution, may further cause the processor to dynamically analyze the near real-time operational data and the plurality of associated parameters to determine and recommend a set of products in the target product segment.

In one embodiment, a non-transitory computer-readable medium storing computer-executable instructions for providing customized product recommendations to a consumer is disclosed. In one example, the stored instructions, when executed by a processor, may cause the processor to perform operations including determining a location of the consumer and a target product segment of interest to the consumer. The operations may further include determining a plurality of field-installed products in the target product segment and in a geographic area of the location. The operations may further include gathering near real-time operational data from each of the plurality of field-installed products along with a plurality of associated parameters for the geographic region using application scripts pre-installed in each of the plurality of field-installed products. The operations may further include dynamically analyzing the near real-time operational data and the plurality of associated parameters to determine and recommend a set of products in the target product segment.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
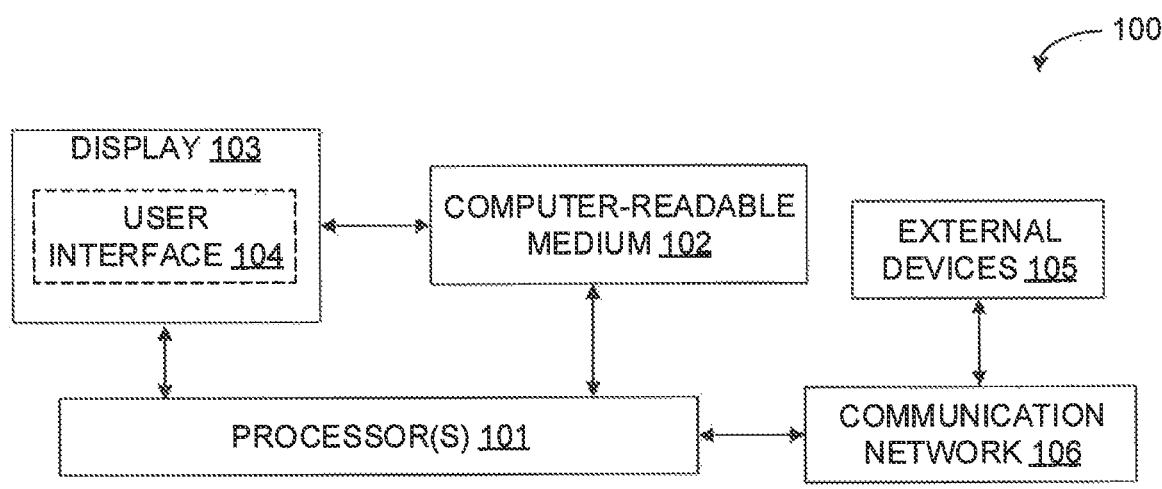
FIG. 1 is a block diagram of an exemplary system for providing customized product recommendations to consumers in accordance with some embodiments of the present disclosure.

Referring now to FIG. 1, an exemplary system 100 for providing customized product recommendations to consumers is illustrated in accordance with some embodiments of the present disclosure. The system 100 may include a computing device having data gathering and data processing capability so as to provide customized product recommendations to the consumers. For example, the system 100 may include, but may not be limited to, server, desktop, laptop, notebook, netbook, tablet, smartphone, mobile phone, or the like. In particular, the system 100 may implement a product recommendation device so as to provide customized product recommendations to the consumers. As will be described in greater detail in conjunction with FIGS. 2-6, the product recommendation device may determine a location of a consumer and a target product segment of interest to the consumer, determine a plurality of field-installed products in the target product segment and in a geographic area of the location, gather near real-time operational data from each of the plurality of field-installed products along with a plurality of associated parameters for the geographic region using application scripts pre-installed in each of the plurality of field-installed products, and dynamically analyze the near real-time operational data and the plurality of associated parameters to determine and recommend a set of products in the target product segment.

The system 100 may include one or more processors 101, a computer-readable medium (e.g., a memory) 102, and a display 103. The computer-readable storage medium 102 may store instructions that, when executed by the one or more processors 101, cause the one or more processors 101 to provide customized product recommendations to consumers in accordance with aspects of the present disclosure. The computer-readable storage medium 102 may also store various data (e.g., consumer profile, location of the consumer, target product segment of interest to the consumer, product purchase history, product registration details, product usage data, dynamic group of field-installed products, near real-time operational data from field-installed products, product data usage policy, associated parameters for geographic regions, recommended products, etc.) that may be captured, processed, and/or required by the system 100. The system 100 may interact with a user (for example, business analysts, business executives, or business leaders belonging to service providers, advertisers, vendors, or manufacturers) via a user interface 104 accessible via the display 103.

Additionally, the system 100 may interact with one or more external devices 105 over a communication network 106 (for example, wired communication network (e.g., Ethernet), wireless communication network (e.g., Wi-Fi), mobile communication network (e.g., long term evolution (LTE) network), Internet, etc. that may support data delivery) for sending or receiving various data. The external devices 105 may include, but are not limited to, remote servers or computing systems (for example, of vendors or manufacturers), digital devices (for example, of consumers), or field-installed products (for example, washing machines, water purifiers, air conditioners, sump motors, solar power systems, or the like).

Figure 2:
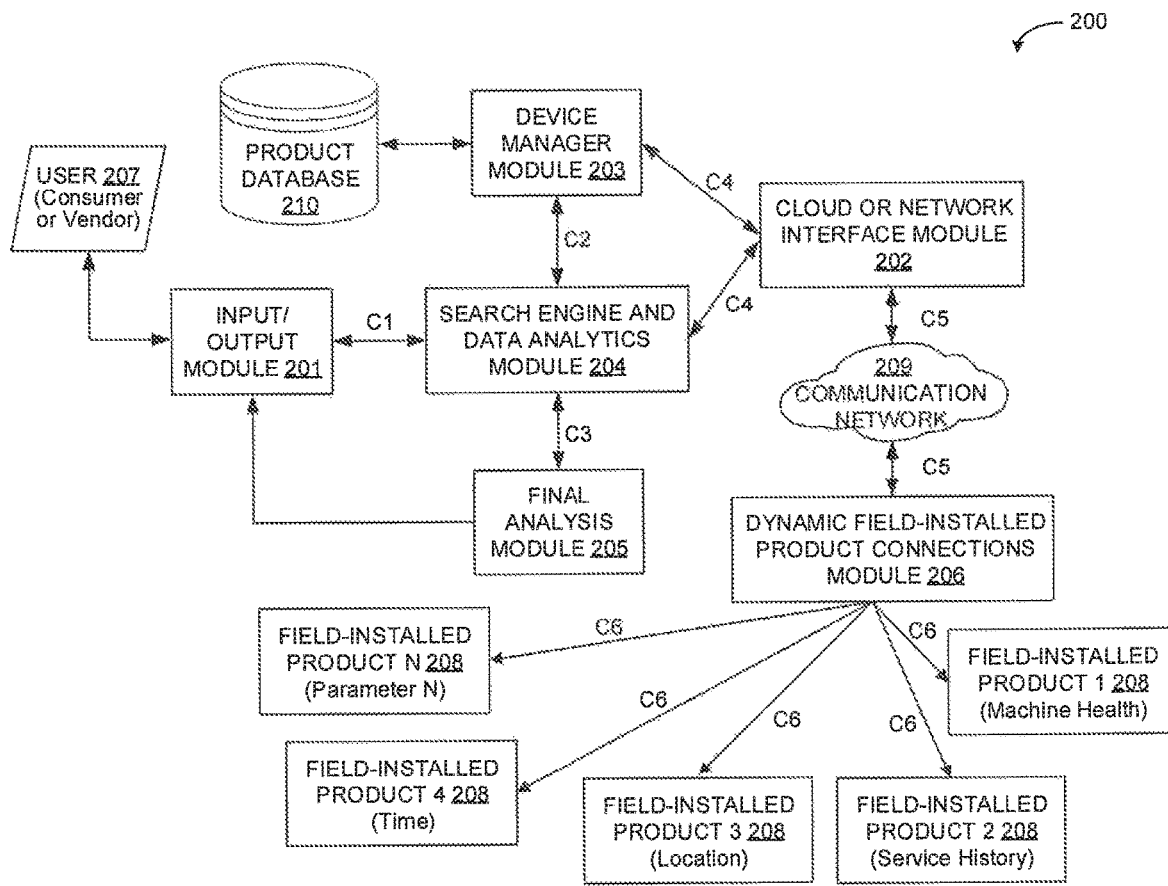
FIG. 2 is a functional block diagram of a product recommendation device, implemented by the system of FIG. 1, in accordance with some embodiments of the present disclosure.

Referring now to FIG. 2, a functional block diagram of the product recommendation device 200, implemented by the system 100 of FIG. 1, is illustrated in accordance with some embodiments of the present disclosure. The product recommendation device 200 may include various modules that perform various functions so as to provide customized product recommendations to the consumers. In some embodiments, the product recommendation device 200 may include an input/output (I/O) module 201, a cloud or network interface module 202, a device manager module 203, a search engine and data analytics module 204, a final analysis module 205, and a dynamic filed-installed product connections module 206. As will be appreciated by those skilled in the art, all such aforementioned modules 201-206 may be represented as a single module or a combination of different modules. Moreover, as will be appreciated by those skilled in the art, each of the modules 201-206 may reside, in whole or in parts, on one device or multiple devices in communication with each other. Further, as will be described in greater detail below, the modules 201-206 may communicate with each other or with external devices (for example, field-installed products 208) through various connections or interfaces C1-C6.

The I/O module 201 may receive the inputs from a user 207 (that is, consumer or vendor) as well as render outputs to the user. The input may include, but may not be limited to, a product search query, a request for product analytics, or the like. Similarly, the outputs may include, buy may not be limited to, customized product recommendations, analytic reports, or the like. In some embodiments, the I/O module 201 may be a web based user interface (UI), which may facilitate the user to search or analyze the products for purchase or to perform various market analysis tasks. The web based UI may have dedicated templates for different tasks such as product search by the consumer, market analysis by the vendor, and so forth. It should be noted that, in some embodiments, the product recommendation device 200 may work on the principle of client-server model. In such embodiments, the web based UI may be in the form of a thin client on a client computing device.

The cloud or network interface module 202 is one of the core modules of the product recommendation device 200. The cloud or network interface module 202 may interact with the field-installed products 208 (that is, smart consumer products already installed at different consumers' premises) so as to gather field data, perform analysis on the gathered data, and provide analytic reports or recommendations to the user. Thus, the cloud or network interface module 202 may have the capability to abstract internal component level details of the field-installed products 208. Again, it should be noted that, in some embodiments, the product recommendation device 200 may work on the principle of client-server model. In such embodiments, the cloud or network interface module 202 may facilitate the interactions between the server and the field-installed products 208 over the communication network 209 (for example, Internet). In other words, the exchange of filed related data (for example, product status and product operational data) may be carried out over the communication network 209.

In some embodiments, some of the field-installed products 208 connected over the communication network 209 may form a dynamic group of field-installed products based on the customer search criteria. For example, the dynamic group of field-installed products may include similar field-installed products from a given geographical region. The product recommendation device 200 may then fetch near real-time product operational data and associated field related data from each of the field-installed products in the dynamic group so as to perform analysis and provide analytic reports or customized recommendations to the user.

The device manager module 203 may be responsible for creating the dynamic groups of filed-installed products 208 based on the different search parameters submitted by the user during search initiation. In some embodiments, the device manager module 203 may gather and may maintain the data related to field-installed products 208 in a product database 210. Further, the device manager module 203 may periodically update the status of the field-installed products 208 for various parameters through application scripts installed on the field-installed products 208.

The data related to the field-installed products 208 may include, but may not be limited to, the product purchase history, product registration details, product usage data, product data usage policy, product operational data, associated field data, or the like. It should be noted that the product purchase history (for example, captured by the vendor while invoicing) and the product registration details (for example, provided by the consumer while registering the product) may be complementary of each other. Thus, the product purchase history and the product registration details, either alone or in combination, may include, but may not be limited to, name of consumer, location of the product, description of the product, model number of the product, configuration of the product, warranty details of the product, or the like. Additionally, the product usage data (for example, captured directly from the product after installation) may include location of the product (for example, determined based on IP address, determined through embedded GPS sensor, etc.), settings performed by the user (for example, total dissolved solid (TDS) setting for the water purifier), or the like. The product data usage policy may be a data gathering and usage permission set by the consumer. For example, the user may permit data exchange only when the product is in idle state. Further, the product operational data may include, but may not be limited to, a current operational state (for example, idle, busy, offline, etc.) of the product, a usage pattern of the product (for example, daily usage of about 2 hours to wash about 6 kg of cloth, weekly usage of about 6 hours with high usage on weekend, etc.), a performance data of the product (for example, time to fill storage tank of water purifier, time required to achieve a desired temperature for the air conditioner, etc.), or a service history of the product (for example, date of last service, description of service, description of replaced or repaired part, etc.). Moreover, the field data associated with the product may include any extrinsic data that are essential for the operation of the product. For example, the field data associated with the product may include, but may not be limited to, environmental or geographical parameters (e.g., water hardness level, TDS of water, air quality, etc.) for a geographic region where the product is installed.

The search engine and data analytics module 204 is a core functional module of the product recommendation device 200. The search engine and data analytics module 204 may control all other modules for creating dynamic groups of field-installed products, gathering near real-time operational data of the field-installed products belonging to one or more of the dynamic groups, managing application scripts for performing various functions, and so forth. For example, the search engine and data analytics module 204 may receive search queries of the user or a profile of the user from the I/O module 201. In some embodiments, the search engine and data analytics module 204 may identify a location of the user and a target product segment of interest to the user based on the search queries performed by the user or the profile of the user. It should be noted that the profile of the user may include, but may not be limited to, queries performed by the consumer, browsing history of the consumer, or social media interactions of the consumer, an IP address of the user, a GPS location of the user, or the like. The search engine and data analytics module 204 in conjunction with the cloud or network interface module 202 and the device manager module 203 may then determine the one of the dynamic groups of field-installed products for executing the application scripts so as to gather their near real-time operational data, to perform analysis of the data, and to provide analytic reports and customized product recommendations. In other words, the search engine and data analytics module 204 in conjunction with the cloud or network interface module 202 and the device manager module 203 may provide analytic reports and customized product recommendations based on the product search queries performed by the user.

The final analysis module 205 may be responsible for analyzing the result received from the search engine and data analytics module 204 and rendering the final analytic reports or customized recommendations to the I/O module 201. In some embodiments, the final analysis module 205 may identify appropriate matching templates to quantify the search results based on the user queries. Further, the final result (that is, analytic reports or customized recommendations) may be presented to the user based on context of search queries or profile of the user. For example, in some embodiments, the results may be displayed based on real-time product requirements of the user and latest product trends. Moreover, in some embodiments, the final analysis module 205 may provide the near real-time operational data for the field-installed products 208 along with the associated filed data for a given geographic region to the vendors or the manufacturers for subsequent planning and customization of product portfolio offerings and service offering for the given geographic region.

The dynamic filed-installed product connections module 206 may be responsible for generation of application scripts. The generated application scripts may fetch the real-time operational data and associated field data of the filed-installed products. Additionally, the dynamic filed-installed product connections module 206 may be responsible for execution sequence of application scripts, determination of the number of filed-installed products available for gathering the required details, or the like. As will be appreciated, once all the information is gathered by the dynamic filed-installed product connections module 206 from the device manger module 203 and the search engine and data analytics module 204 through the cloud or network interface module 202, the dynamic filed-installed product connections module 206 may automatically trigger execution of the application scripts on the target field-installed products based on the search criteria. It should be noted that the scripts for fetching the product operational detail and associated field data may be generated based on the search criteria. The fetched data may then be transferred to the search engine and data analytics module 204, through the cloud or network interface module 202, for analyzing the results and updating the data on the database 210.

As will be appreciated, each of the connections or interfaces, C1-C6, may acquire or transfer data from one module 201-206 or field-installed products 208 to other module 201-206 or field-installed products 208 using standard wired or wireless data connections means. For example, each of the connections or interfaces, C1-C6, may employ one or more connection protocols including, but not limited to, serial advanced technology attachment (SATA), integrated drive electronics (IDE), IEEE-1394, universal serial bus (USB), fiber channel, small computer systems interface (SCSI), STD Bus, RS-232, RS-422, RS-485, 12C, SPI, Microwire, 1-Wire, IEEE 1284, Intel® QuickPathInterconnect, InfiniBand, PCIe, or the like.

In particular, the interface C1 may form the front end standard search interface for the user to search or analyze the required product details. It may employ standard predefined templates for entering the search criteria. Additionally, the interface C2, between the search engine and analytics module 204 and the device manager module 203, may fetch the product purchase history and other details stored on the database 210. Further, the interface C3 may facilitate the final analysis module 205 to process and render search results to the user. Further, the interfaces C4 and C5 may be network interfaces between the modules present on the server (that is, device manager module 203 and the search engine and data analytics module 204) and the virtual cloud based modules (that is, cloud or network interface module 202 and the dynamic filed-installed product connections module 206) for controlling the field-installed products for fetching the near real-time operational data of the product and associated field data with respect to the product. Moreover, the interface C6 may be a wired or a wireless interface between the dynamic filed-installed product connections module 206 and field-installed products 208.

As will be appreciated, the product recommendation device 200 described above may provide analytic reports and customized product recommendations to the user (that is, vendors or consumers) based on near real-time operational data and associated field data received from similar field-installed products in a given geographic region, for better decision making of the user. In particular, the product recommendation device 200 may automatically search and recommend substantially appropriate products to consumers by automatically leveraging the different operational parameters associated with the similar products installed at the consumers' premises in a given geographical region. The product recommendation device 200 may employ map parsing and geolocation techniques to identify similar field-installed products in the given geographic region.

By way of an example, if a consumer is searching for water purifier in Bangalore, the product recommendation device 200 may analyze the user profile (for example, user browsing history and social media interactions) so as to determine the location of the user or location for which the target product is being searched for (that is, Bangalore) and the target product segment (that is, water purifier). The product recommendation device 200 may then determine similar products (that is, water purifiers) that have been installed in the determined location (that is, Bangalore). Thus, upon identifying the location of user or location for which the target product is being searched for, the product recommendation device 200 may employ self-trained machine learning model and product purchase history to determine similar field-installed products in that geographic region (that is, filed-installed water purifiers in Bangalore).

Upon identification of the similar filed-installed products in the target geographic region, the product recommendation device 200 may gather near real-time operational data of the identified filed installed products along with associated field data for the identified field-installed products (that is, different operational and field parameters associated with filed-installed water purifiers in Bangalore). As stated above, the data may be gathered directly from the identified field-installed products 208 and transmitted to the device manager module 203 and the search engine and data analytics module 204 at the server for storage and for further analysis. Upon analysis, the product recommendation device 200 may provide customized recommendations to the consumer. Thus, the search engine and data analytics module 204 may use this near real-time operational data along with other filed-related data to assess the health of filed-installed products, and accordingly identify and recommend suitable products from among the available products to the user. In the discussed example, the product recommendation device 200 may analyze the real-time water purification parameters of the water purifiers installed in Bangalore and water characteristics of Bangalore so as to recommend substantially suitable water purifiers to the consumer.

Additionally, the outcome of such analysis may be used to provide product performance statistics to vendors or manufacturers for planning and customizing their product portfolio based on geographical characteristics (for example, water characteristics) across the given geographical region. Further, vendors or manufacturers may plan and deploy right set of service personnel for the given geographical region based on the product performance statistics. In other words, the product recommendation device may not only help in recommending appropriate products to suit the user's geographical location, but also support the vendors or the manufacturers in minimizing the multiple service visits.

It should be noted that the product recommendation device 200 may be implemented in programmable hardware devices such as programmable gate arrays, programmable array logic, programmable logic devices, or the like. Alternatively, the product recommendation device 200 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

As will be appreciated by one skilled in the art, a variety of processes may be employed for providing customized product recommendations to consumers. For example, the exemplary system 100 and the associated product recommendation device 200 may provide customized product recommendations to the consumers by the processes discussed herein. In particular, as will be appreciated by those of ordinary skill in the art, control logic and/or automated routines for performing the techniques and steps described herein may be implemented by the system 100 and the associated product recommendation device 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
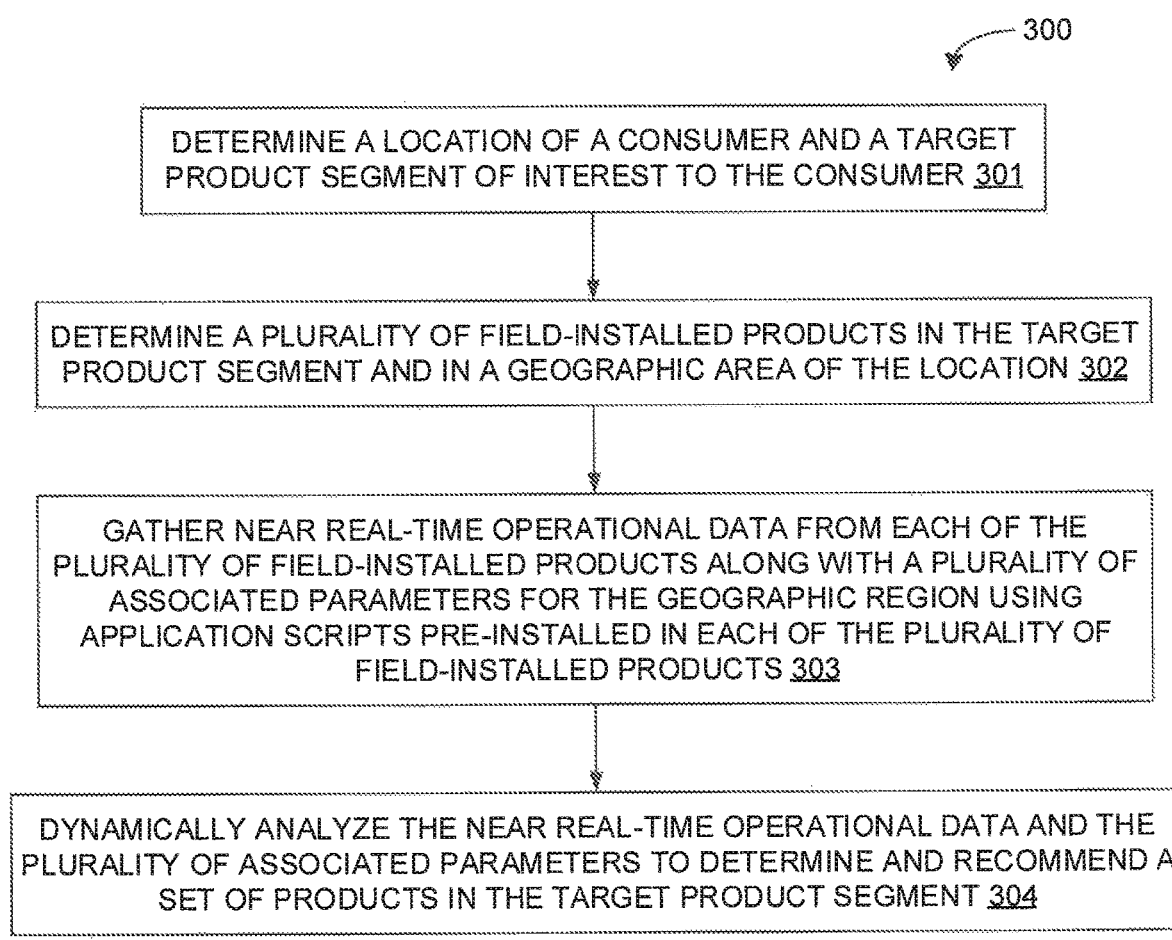
FIG. 3 is a flow diagram of an exemplary process for providing customized product recommendations to consumers in accordance with some embodiments of the present disclosure.

For example, referring now to FIG. 3, exemplary control logic 300 for providing customized product recommendations to consumers via a system, such as system 100, is depicted via a flowchart in accordance with some embodiments of the present disclosure. As illustrated in the flowchart, the control logic 300 may include the steps of determining a location of a consumer and a target product segment of interest to the consumer at step 301, determining a plurality of field-installed products in the target product segment and in a geographic area of the location at step 302, gathering near real-time operational data from each of the plurality of field-installed products along with a plurality of associated parameters for the geographic region using application scripts pre-installed in each of the plurality of field-installed products at step 303, and dynamically analyzing the near real-time operational data and the plurality of associated parameters to determine and recommend a set of products in the target product segment at step 304. In some embodiments, the control logic 300 may further include the step of providing the near real-time operational data for each of the plurality of field-installed products along with the plurality of associated parameters for the geographic region to at least one of a vendor or a manufacturer for subsequent planning and customization of product portfolio offerings and service offering for the geographic region.

In some embodiments, determining the location and the target product segment at step 301 may include the step of analyzing a profile of the consumer. Additionally, in some embodiments, the consumer profile may include at least one of queries performed by the consumer, browsing history of the consumer, or social media interactions of the consumer. Further, in some embodiments, determining the plurality of field-installed products at step 302 may include the step of analyzing at least one of product purchase history, product registration details, or product usage data.

In some embodiments, gathering the neat real-time operational data from a field-installed product at step 303 may be based on product data usage policy set by the consumer. It should be noted that, in some embodiments, the near real-time operational data of a field-installed product may include at least one of a current operational state of the field-installed product, a usage pattern of the field-installed product, a performance data of the field-installed product, or a service history of the field-installed product. Further, in some embodiments, the plurality of associated parameters for a geographic region may include a plurality of environmental parameters for the geographic region that are essential for an operation of a field-installed product.

Figure 4:
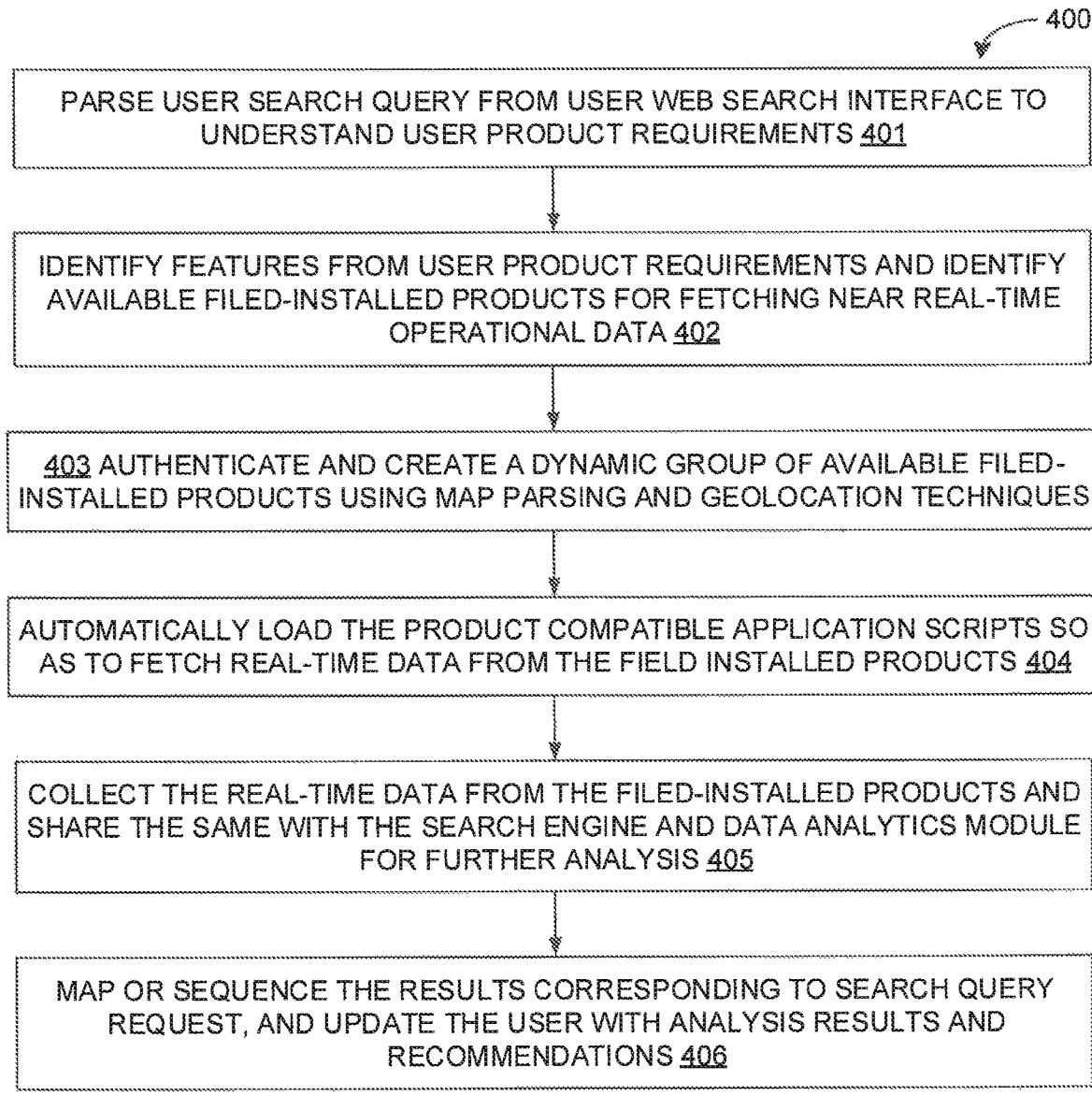
FIG. 4 is a flow diagram of a detailed exemplary process for providing customized product recommendations to consumers in accordance with some embodiments of the present disclosure.

Referring now to FIG. 4, exemplary control logic 400 for providing customized product recommendations to consumers, based on near real-time operational data received from similar field-installed products in a target region, is depicted in greater detail via a flowchart in accordance with some embodiments of the present disclosure. As illustrated in the flowchart, at step 401, the control logic 400 may parse the search query (for example, from user web search interface) so as to understand the user product requirements. In some embodiments, natural text processing and understanding techniques may be applied on to the user provided text input data so as to extract the user (that is, customer or vendor) product requirements. In other words, the control logic 400 may process the user search query so as to understand the user intended product features. The control logic 400 may further support unstructured free text searching capabilities to arrive at the intended search results. For example, the user may search for 'best hardwater water purifier in the market', which may result in a search failure or may ask the user to provide additional details based on above search query. In contrast, as will be described in detail below, the control logic 400 may understand the search query and return customized search results in a structured manner based on the relevancy.

Figure 5:
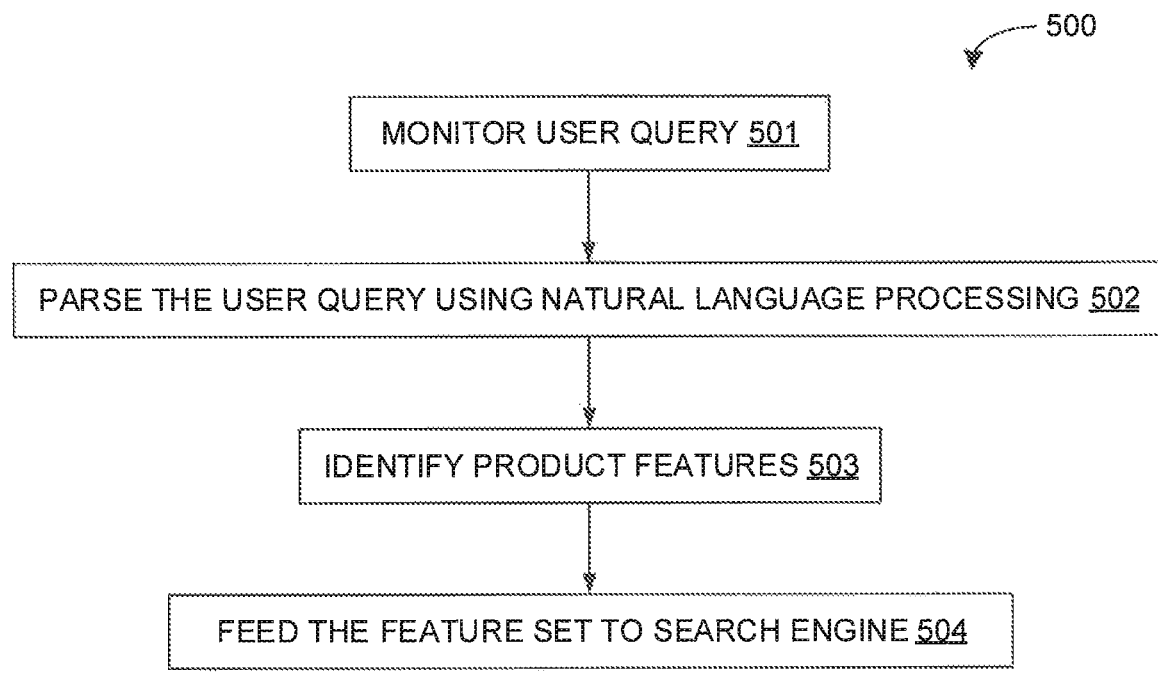
FIG. 5 is a flow diagram of an exemplary process for determining user product requirements in accordance with some embodiments of the present disclosure.
Figure 6:
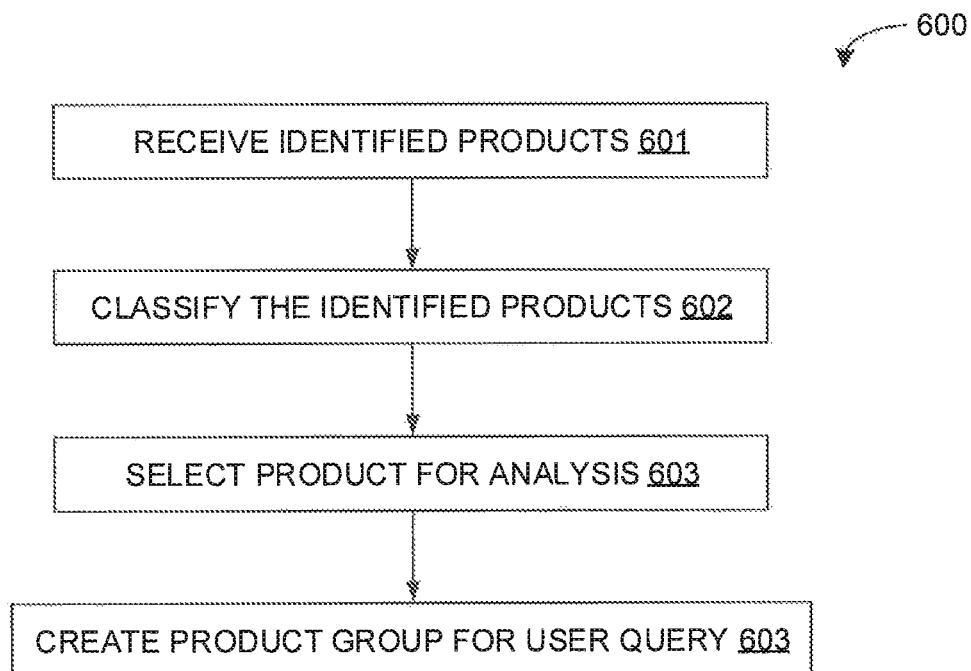
FIG. 6 is a flow diagram of an exemplary process for creating a dynamic group of field-installed products in accordance with some embodiments of the present disclosure.

Referring now to FIG. 5, exemplary control logic 500 for determining user product requirements is depicted via a flowchart in accordance with some embodiments of the present disclosure. As illustrated in the flowchart, at step 501, the control logic 500 may monitor user queries performed with respect to a target product segment. At step 502, the control logic 500 may parse the user query using natural language processing. Additionally, at step 503, the control logic 500 may identify a set of features corresponding to the target product segment. Further, at step 504, the control logic 500 may feed the set of identified features to the search engine and data analytics module 204 so as to perform the search and provide the customized recommendations.

Referring back to FIG. 4, at step 402, the control logic 400 may identify features from user product requirements and identify available filed-installed products for fetching near real-time operational data. The control logic 400 may transmit the open query to identify a group of available filed-installed products in a particular geographical area where the user is interested (that is, where the user is planning to buy or install the purchased product). By way of an example, in some embodiments, exemplary classification codes that may be assigned for different products are provided in Table A below:

TABLE A

| Product | Serial Number |
|---|---|
| W001DDMMYY | Smart Water Purifier |
| U002DDMMYY | Smart UPS |
| A003DDMMYY | Smart Air purifier |
| V004DDMMYY | Smart Vacuum cleaner |
| Etc. | Etc. |

The open query may then get the information about the available filed-installed products functioning in the field. Once the open query may fetch these serial numbers or product numbers, then the same may be updated to the dynamic filed-installed product connections module 206. As will be appreciated, the dynamic filed-installed product connections module 206 may then map the incoming data (that is, near real-time operational data and field data) with the product information available in the product database 210 so as to identify the available products for analysis. It should be noted that, typically, the field-installed products may be registered with the database 210 with other details like device location, device model, etc. Further, it should be noted that the device registration may be done with the consent of product owner through self-declaration, reward programs, etc. and the usage of product related data for product testing or recommendation purposes may also be based on product owner preferences (that is, time of the day, during meetings, when device is not in operation, etc.). Additionally, the usage patterns of products may be registered in the database 210 for determining the operational condition of the product to use for testing and such details may also be stored in the database 210.

At step 403, the control logic 400 may authenticate and create a dynamic group of available field-installed products using map parsing and geolocation techniques. Before selecting particular field-installed products for further analysis, the control logic 400 may classify the identified products into the different product categories. In the process of product selection, the control logic 400 may employ map parsing and geolocation techniques so as to identify suitable field-installed products in a given geographic region based on the set of features derived from user search queries. Further, the authentication of the product may be done by comparing the product details mentioned in the purchase history (for example, maintained by the product vendors). The geolocation technique may help in identifying field-installed products in the given geographic region, while the map parsing technique may help in identifying the similar field-installed products for fetching the product operational data. Once the dynamic groups of field-installed products have been created based on certain conditions, the control logic 400 may update the group information to the device manager 203 and the search engine and data analytics module 204 on the server for further processing. By way of an example, in some embodiments, exemplary parameters for dynamic selection of filed-installed products are provided in Table B below:

TABLE B

Consumer product Version/model/Operating System (Android/Windows/iOS) etc.
Geography, location of the consumer product
Device idleness or activity at the time of fetching the functionality details of the product.
Common health parameters of the product so that user is not affected for the usage Referring now to FIG. 6, exemplary control logic 600 for creating a dynamic group of field-installed products is depicted via a flowchart in accordance with some embodiments of the present disclosure. As illustrated in the flowchart, at step 601, the control logic 600 may receive a set of identified field-installed products (for example, from step 402 discussed above). Further, at step 602, the control logic 600 may classify the identified field-installed products. Further, at step 603, the control logic 600 may select a class of field-installed products from the identified field-installed products for further analysis. Moreover, at step 604, the control logic 600 may create the dynamic group of field-installed products for user query. As stated above, the control logic 600 may employ map parsing and geolocation techniques so as to identify a group of similar field-installed products in a given geographic region based on the set of features derived from user search queries.

Referring back to FIG. 4, at step 404, the control logic 400 may automatically load the product compatible application scripts on each of the dynamic group of field-installed products so as to fetch real-time data from these field-installed products. It should be noted that the application script files may be loaded or installed on to the field-installed products for fetching the near real-time operational data and associated field data without affecting the functionality of the products. Upon loading of the application scripts, the loaded scripts may be executed for gathering the near real-time operational data associated with different components of the field-installed product. Additionally, in some embodiments, the loaded scripts may be executed for gathering the field data associated with the operation of the field-installed product. As will be appreciated, the search engine and data analytics module 204 may push the application scripts on the field-installed products 208, while the dynamic filed-installed product connections module 206 may control the application scripts so as to fetch necessary operational data and field data from the field-installed products 208. Further, in some embodiments, the generic application scripts may be updated with user interface (UI) coordinates and other data gathering application specific details. These details may then be used during the execution of the application scripts.

At step 405, the control logic 400 may collect the near real-time operational data from the field-installed products along with the field data. The control logic 400 may then share the same with the search engine and data analytics module 204 for further analysis. As will be appreciated, the data gathering may be performed in different modes—synchronous mode, asynchronous mode, and background mode. In the synchronous mode, once the dynamic group of qualified filed-installed products has been created, the application scripts may be executed simultaneously such that the operational data may be fetched in near real-time. Further, in the asynchronous mode, the identified field-installed products may be configured with a series of data fetching application script files to be executed on the products. The execution of these application scripts may happen at later point when products meet the search query criteria. Moreover, in the background mode, the execution of application scripts may be performed in background as a demon activity. The results may be aggregated once received. The data gathered through different modes may then be passed to the search engine and data analytics module 204 for further analysis.

At step 406, the control logic 400 may map or sequence the results corresponding to search query request, and update the user with analysis results and recommendations. Thus, based on the data analytics, the control logic 400 may compile or formulate the final results in user interested pre-defines templates. The control logic 400 may then render or present the compiled results to the user (that is, customer or vendor). Further, the control logic 400 may collect user feedback so as to train the system for parsing and processing future search queries, and provide improved and more accurate search results.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
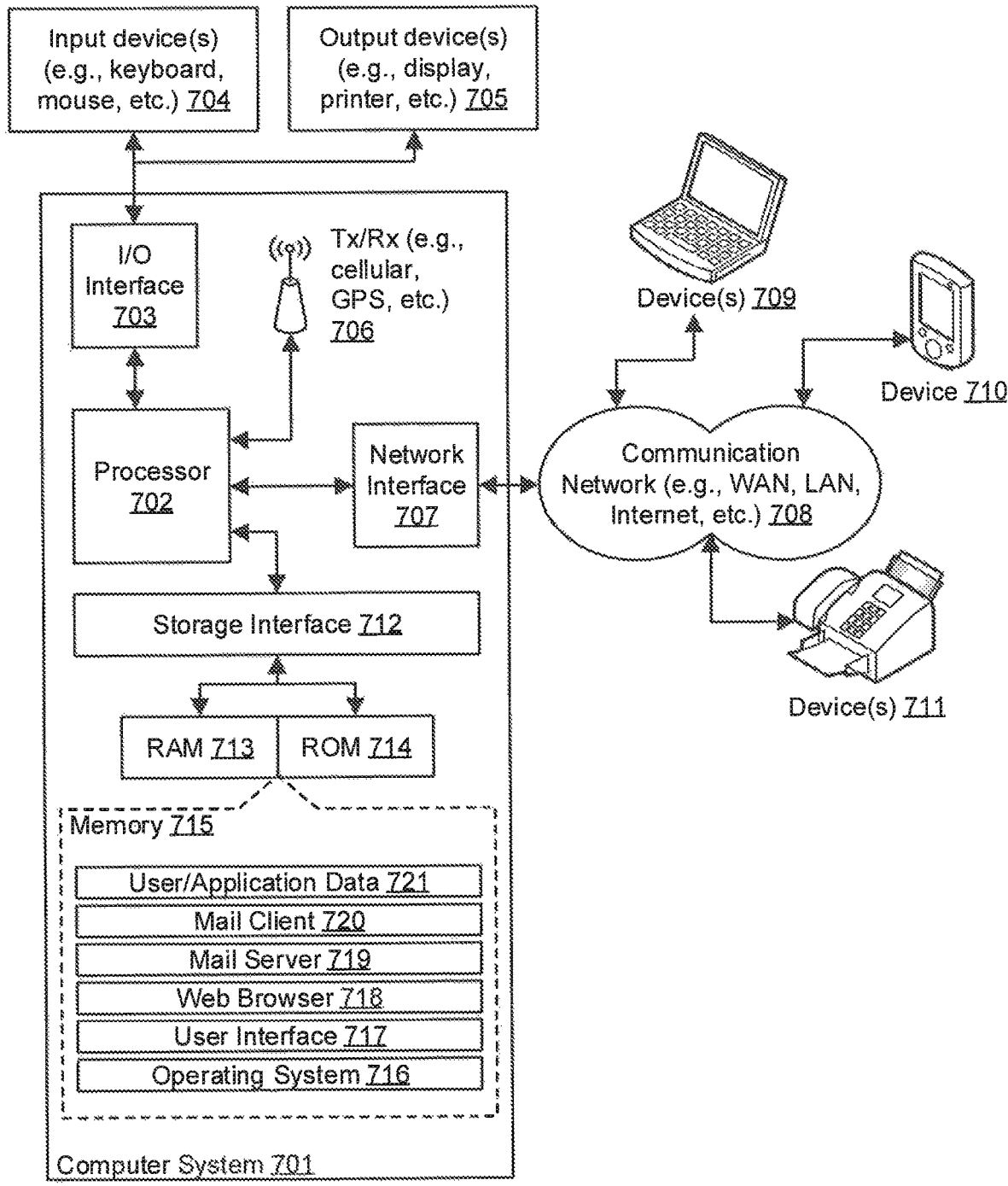
FIG. 7 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, a block diagram of an exemplary computer system 701 for implementing embodiments consistent with the present disclosure is illustrated. Variations of computer system 701 may be used for implementing system 100 for providing customized product recommendations to consumers. Computer system 701 may include a central processing unit ("CPU" or "processor") 702. Processor 702 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEI 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., TEXAS INSTRUMENTS® WILINK WL1286¹, BROADCOM® BCM45501UB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 709, 710, and 711. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT XBOX®, NINTENDO® DS®, SONY® PLAYSTATION®, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, 12C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, APPLE® Macintosh® operating systems'

AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 701 may implement a web browser 718 stored program component. The web browser may be a hypertext viewing application, such as MICROSOFT® INTERNET EXPLORER®, GOOGLE® CHROME®, MOZILLA® FIREFOX®, APPLE® SAFARI® etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 701 may implement a mail server 719 stored program component. The mail server may be an Internet mail server such as MICROSOFT EXCHANGE®, or the like. The mail server may utilize facilities such as ASP, ActiveX, ANSI C++ IC#, MICROSOFT .NET CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 701 may store user/application data 721, such as the data, variables, records, etc. (e.g., consumer profile, location of the consumer, target product segment of interest to the consumer, product purchase history, product registration details, product usage data, dynamic group of field-installed products, near real-time operational data from field-installed products, product data usage policy, associated parameters for geographic regions, recommended products, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for analytic reports and customized product recommendations to the user (that is, vendors or consumers) based on near real-time operational data and associated field data received from similar field-installed products in a given geographic region. In particular, the techniques provide for searching and recommending one or more relevant products to user based on the real-time operational data of similar field-installed products in the specific environmental or geographical conditions of the region in which the product is intended to be used. As will be appreciated, the techniques provide for accurate and reliable data with respect to functionality of the products installed at the consumers' premises in a given geographic region so as to validate product failures in the given geographic region, deploy right service personnel for the given geographical region, expand product portfolio in the given geographic region, provide customized product recommendations for the given geographic region, and so forth. In other words, the techniques provide better functional information and recommendations with respect to the products to both the vendors and the consumers.

Additionally, the techniques described in the various embodiments discussed above may be implemented using various technology models (for example, Internet of Things (IoT), dedicated system, as a service, etc.). As stated above, the techniques may provide recommendations for appropriate products based on real-time operational data of similar field-installed products, thereby enabling consumers to directly place their orders (that is, without being dependent on experience of sales personnel) based on their requirements. Further, frequent failure of the filed-installed products may be minimized as the recommendations are based on near real-time operational data as well as associated field data. Moreover, the techniques may automatically recommend or allocate service personnel for various locations without user involvement.

The specification has described method and system for providing customized product recommendations to consumers. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of providing customized product recommendations to a consumer, the method comprising:

determining, by a product recommendation device, a location of the consumer and a target product segment of interest to the consumer;

determining, by the product recommendation device, a plurality of field-installed products in the target product segment and in a geographic area of the location;

gathering, by the product recommendation device, near real-time operational data from each of the plurality of field-installed products along with a plurality of associated parameters for the geographic region using application scripts pre-installed in each of the plurality of field-installed products; and dynamically analyzing, by the product recommendation device, the near real-time operational data and the plurality of associated parameters to determine and recommend a set of products in the target product segment;

wherein gathering the near real-time operational data from a field-installed product is based on product data usage policy set by the consumer, and wherein the product data usage policy permits data exchange only when the field-installed product is in an idle state.

2. The method of claim 1, wherein determining the location and the target product segment comprises analyzing a profile of the consumer.

3. The method of claim 2, wherein the consumer profile comprises at least one of queries performed by the consumer, browsing history of the consumer, or social media interactions of the consumer.

4. The method of claim 1, wherein determining the plurality of field-installed products comprises analyzing at least one of product purchase history, product registration details, or product usage data.

5. The method of claim 1, wherein the near real-time operational data of a field-installed product comprises at least one of a current operational state of the field-installed product, a usage pattern of the field-installed product, a performance data of the field-installed product, or a service history of the field-installed product.

6. The method of claim 1, wherein the plurality of associated parameters for a geographic region comprises a plurality of environmental parameters for the geographic region that are essential for an operation of a field-installed product.

7. The method of claim 1, further comprising providing the near real-time operational data for each of the plurality of field-installed products along with the plurality of associated parameters for the geographic region to at least one of a vendor or a manufacturer for subsequent planning and customization of product portfolio offerings and service offering for the geographic region.

8. A system for providing customized product recommendations to a consumer, the system comprising:

a product recommendation device comprising at least one processor and a computer-readable medium storing instructions that, when executed by the at least one processor, cause the at least one processor to perform operations comprising:

determining a location of the consumer and a target product segment of interest to the consumer;

determining a plurality of field-installed products in the target product segment and in a geographic area of the location;

gathering near real-time operational data from each of the plurality of field-installed products along with a plurality of associated parameters for the geographic region using application scripts pre-installed in each of the plurality of field-installed products; and dynamically analyzing the near real-time operational data and the plurality of associated parameters to determine and recommend a set of products in the target product segment;

wherein gathering the near real-time operational data from a field-installed product is based on product data usage policy set by the consumer, and wherein the product data usage policy permits data exchange only when the field-installed product is in an idle state.

9. The system of claim 8, wherein determining the location and the target product segment comprises analyzing a profile of the consumer.

10. The system of claim 9, wherein the consumer profile comprises at least one of queries performed by the consumer, browsing history of the consumer, or social media interactions of the consumer.

11. The system of claim 8, wherein determining the plurality of field-installed products comprises analyzing at least one of product purchase history, product registration details, or product usage data.

12. The system of claim 8, wherein the near real-time operational data of a field-installed product comprises at least one of a current operational state of the field-installed product, a usage pattern of the field-installed product, a performance data of the field-installed product, or a service history of the field-installed product.

13. The system of claim 8, wherein the plurality of associated parameters for a geographic region comprises a plurality of environmental parameters for the geographic region that are essential for an operation of a field-installed product.

14. The system of claim 8, wherein the operations further comprise providing the near real-time operational data for each of the plurality of field-installed products along with the plurality of associated parameters for the geographic region to at least one of a vendor or a manufacturer for subsequent planning and customization of product portfolio offerings and service offering for the geographic region.

15. A non-transitory computer-readable medium storing computer-executable instructions for:

determining a location of a consumer and a target product segment of interest to the consumer;

determining a plurality of field-installed products in the target product segment and in a geographic area of the location;

gathering near real-time operational data from each of the plurality of field-installed products along with a plurality of associated parameters for the geographic region using application scripts pre-installed in each of the plurality of field-installed products; and dynamically analyzing the near real-time operational data and the plurality of associated parameters to determine and recommend a set of products in the target product segment;

wherein gathering the near real-time operational data from a field-installed product is based on product data usage policy set by the consumer, and wherein the product data usage policy permits data exchange only when the field-installed product is in an idle state.

16. The non-transitory computer-readable medium of claim 15, wherein determining the location and the target product segment comprises analyzing a profile of the consumer, and wherein the consumer profile comprises at least one of queries performed by the consumer, browsing history of the consumer, or social media interactions of the consumer.

17. The non-transitory computer-readable medium of claim 15, wherein determining the plurality of field-installed products comprises analyzing at least one of product purchase history, product registration details, or product usage data.

18. The non-transitory computer-readable medium of claim 15, wherein the near real-time operational data of a field-installed product comprises at least one of a current operational state of the field-installed product, a usage pattern of the field-installed product, a performance data of the field-installed product, or a service history of the field-installed product, and wherein the plurality of associated parameters for a geographic region comprises a plurality of environmental parameters for the geographic region that are essential for an operation of a field-installed product.

* * * * *